Sept. 26, 1944.  A. SCHWARZ  2,358,941
PHOTOFLASH SYNCHRONIZING MECHANISM
Filed Nov. 6, 1942  3 Sheets-Sheet 1

INVENTOR.
Alfred Schwarz
BY
Cumpston & Shepard
his Attorneys

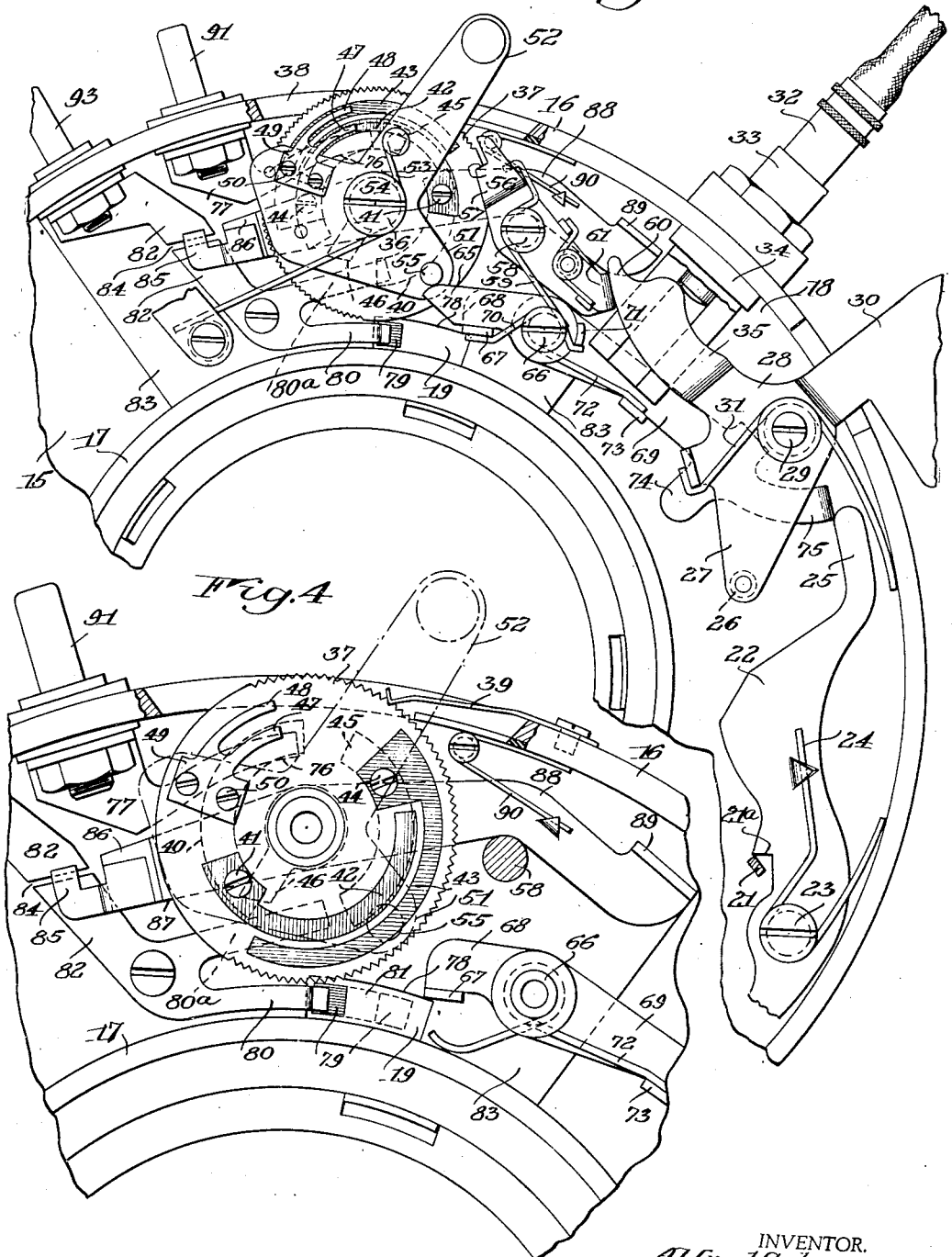

Sept. 26, 1944.  A. SCHWARZ  2,358,941
PHOTOFLASH SYNCHRONIZING MECHANISM
Filed Nov. 6, 1942  3 Sheets-Sheet 3
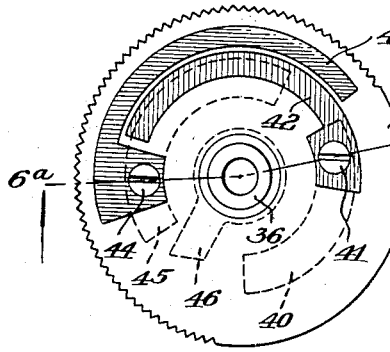
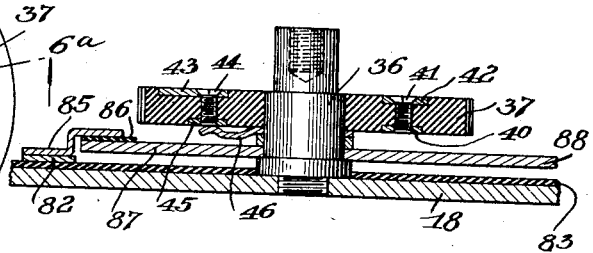
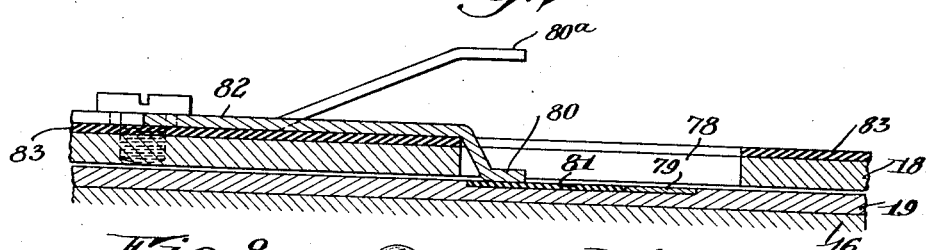
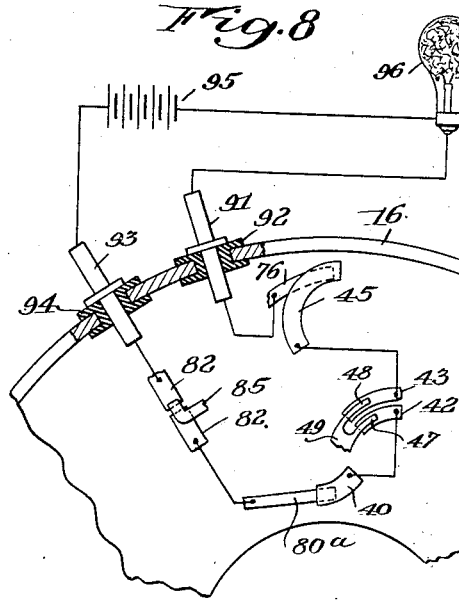
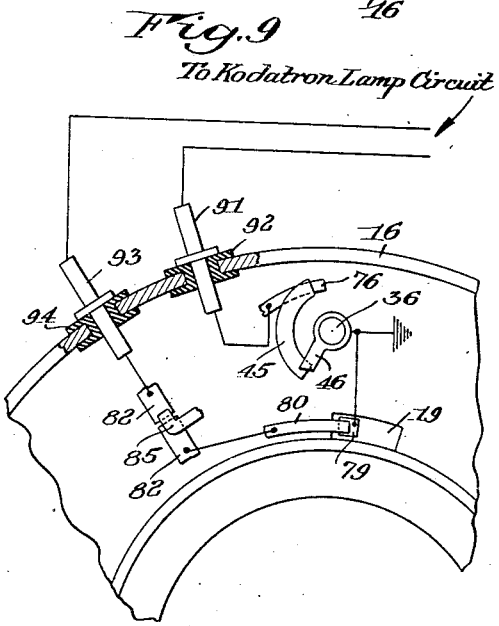
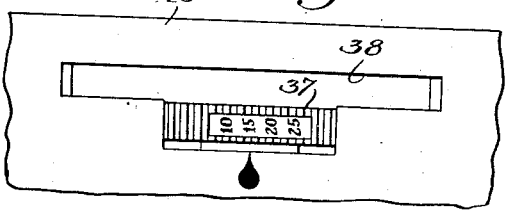
INVENTOR.
Alfred Schwarz
BY Cumpston & Shepard
his Attorneys Patented Sept. 26, 1944

2,358,941

UNITED STATES PATENT OFFICE 2,358,941

PHOTOFLASH SYNCHRONIZING MECHANISM

Alfred Schwarz, Rochester, N. Y., assignor to Ilex Optical Company, Rochester, N. Y., a corporation of New York Application November 6, 1942, Serial No. 464,769

14 Claims. (Cl. 67—29)

This invention relates to photoflash synchronizing mechanism wherein an electric circuit, containing a flashlight and a source of energy, is closed for producing an illuminating flash in timed synchronization with the opening of a camera shutter.

It is a known fact that there is a time lag of definite and calculable duration existing from the instant electrical contact is made in closing a flashlight circuit, to the peak of the illumination produced by the energizing of the flashlight. This time lag is quite uniform in flashlights of the same rating and source of manufacture, but varies in flashlights of different kinds. Some commercial types of flashlights or bulbs, have appreciable time lags, while at least one variety reaches its peak of illumination at substantially the instant that contact is made. It is also a known fact that there is likewise a time lag in the operation of the camera shutter, existing from the instant of initial actuation until it reaches its fully open position, such lag depending upon the several variable mechanical factors entering into the construction of a shutter. This lag may vary in a given shutter also as its different parts wear or deteriorate in use.

The present invention, taking cognizance of these time lag phenomena, has for one of its objects the provision of a new and improved mechanism for readily and precisely synchronizing the instant of maximum illumination by the flashlight and of opening of the shutter blades, for insuring efficient photographic results.

Another object is to provide a synchronizing mechanism capable of being readily and accurately adjusted to synchronize a given flashlight with a given shutter, and also a wide range of different flashlights with the same shutter.

Another object is to provide a synchronizing mechanism built into and enclosed and protected within the casing of the shutter mechanism itself.

Another object is the provision of a synchronizing mechanism so combined with a shutter mechanism as not to interfere with the normal operation of the shutter, but capable of being easily and conveniently brought into cooperation with the shutter mechanism when desired. A further object, more specifically, is to afford a synchronizer which, after being employed, automatically restores the shutter to condition ready for normal use, without any interference by the synchronizer, thus simplifying the operation and reducing the tendency to errors in manipulation.

Another object is to provide an adjustable synchronizing mechanism which, when brought into use, may be set to first close the electrical circuit through the flashlight, in accordance with its time lag and thereafter operate the shutter in synchronization with the peak of illumination.

A further object is a synchronizing mechanism comprising a flashlight circuit so arranged as to be normally open and incapable of being closed except when the synchronizing mechanism is set for operation and the shutter itself operated, thus safeguarding the circuit against injury and the bulb against premature flashing, so that the lamp and its source of energy may be safely connected to the synchronizer at any time.

Another object is to provide a synchronizer mechanism of such mechanical construction as to operate without shock or impact, and with a minimum of tension or force, thereby eliminating interference with the steady support of the camera.

Still further objects are a synchronizing mechanism of the above character having a simple, efficient and inexpensive type of construction and one which is simple and convenient in use by an operator.

To these and other ends the invention resides in certain improvements and combinations of parts, all as will be hereinafter more fully described, the novel features being pointed out in the claims at the end of the specification.

In the drawings:

Fig. 3 is a view similar to Fig. 1, with some of the portions omitted, but showing an intermediate position of the parts in course of operation;

Fig. 4 is a view similar to Fig. 3, with additional portions omitted or in broken lines, the parts being shown in course of operation but adjusted for a different time lag;

Fig. 5 is an enlarged side view of a portion of the contact device;

Fig. 6 is a sectional view on the line 6a—6a in Fig. 5 and showing some additional parts;

Fig. 7 is a sectional view on the line 7a—7a in Fig. 2;

Fig. 8 is a diagram of the electrical circuit in one adjusted position of the contact device;

Fig. 9 is a similar view of the circuit in another adjusted position of the contact device, and Fig. 10 is a fragmentary edge view of the contact dial with its adjusting indicia.

Figures 1, 2:
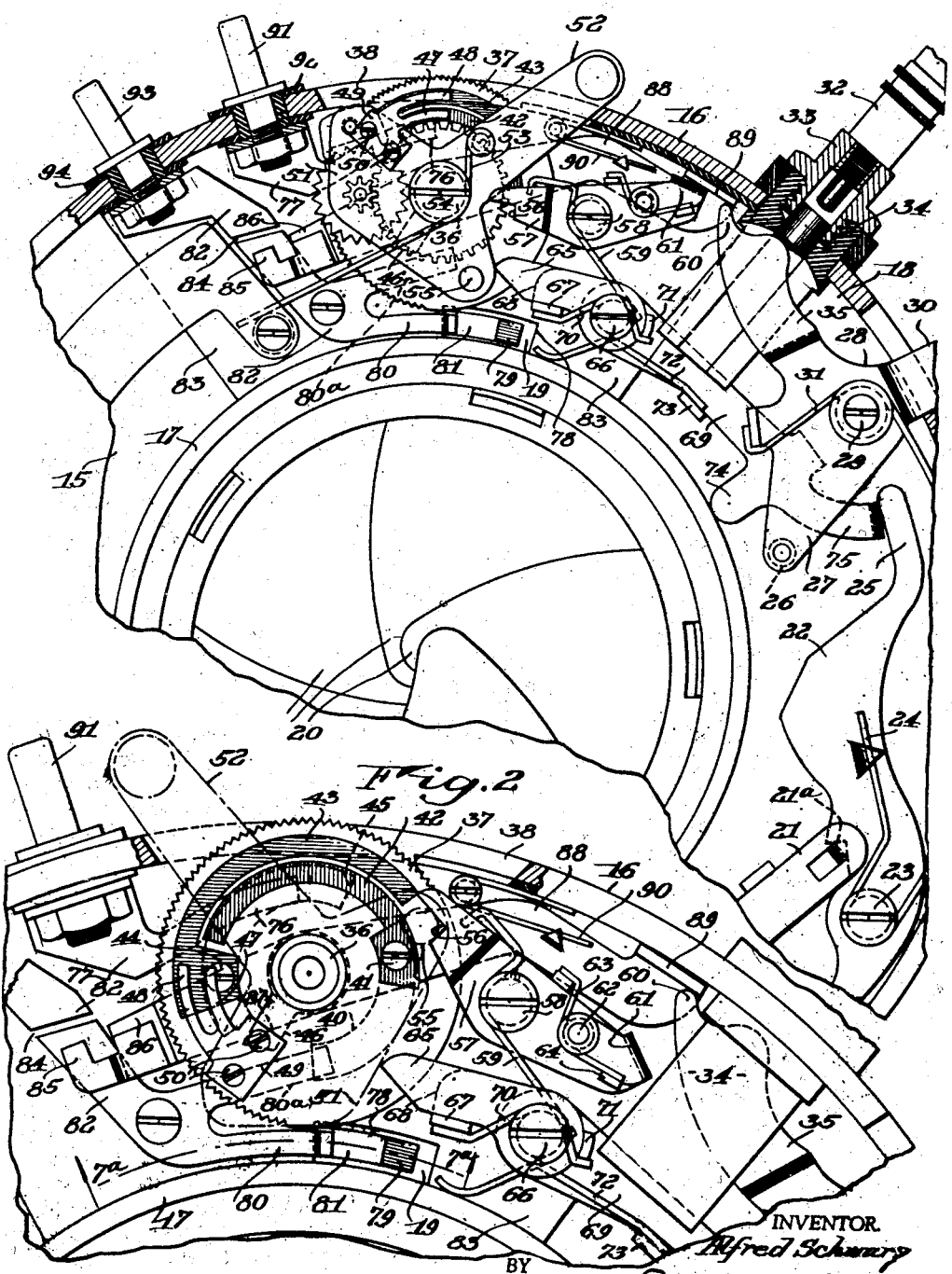
Fig. 1 is an enlarged, detailed, fragmentary plan view, partly in section, of an open shutter casing and its mechanism and showing a synchronizer embodying the present invention, in fully released or inactive position.
Fig. 2 is a similar view, with some of the upper portions removed or shown in broken lines, the parts being in fully set position ready for operation.

The invention is embodied in the present instance, by way of illustration of the principles involved, in conjunction with a shutter mechanism enclosed in an annular casing which is indicated generally at 15, comprising an outer cylindrical side wall 16 and an inwardly annular spaced cylindrical side wall 17, with an intermediate depressed partition wall 18 on which the mechanism is largely mounted. The blade ring is shown at 19, having any known or suitable actuating connections with the shutter blades 20.

The invention is adaptable to a variety of known shutter mechanisms, being shown in the present instance in conjunction with a known shutter of the "set" type comprising a master lever 21 adapted to be tensioned or set by manually operable means (not shown), as well understood in the art. The master lever, when tensioned, is held by engagement in a notch 21a in a locking lever 22 pivoted on the casing at 23 and held in locking position by a spring 24. The locking lever has an extended end 25 positioned for engagement in normal operation by a pin 26 on one branch 27 of a trigger lever 28 pivoted on a post 29 on the wall 18 of the casing and having a finger piece 30 extending exteriorly through an opening in the outer wall 16 of the casing. A spring 31 urges the trigger to the inactive position shown in Fig. 1 and the pressure of the finger swings it anticlockwise, so that pin 26 engages end 25 of the locking lever 22 and swings it in clockwise direction to release the master lever 21, as well understood in the art. The trigger may be actuated also by a cable release 32 of any known or suitable construction, screwed into a sleeve 33 which in turn is screwed into an insulating bushing 34 fixed in an opening in the casing, the plunger of the cable release being positioned for engagement in a known manner with an opposite branch 35 of the trigger lever, to operate the shutter.

The synchronizer mechanism is built into and enclosed by the shutter casing 15, to the left of the triggr 28, as shown. It comprises, preferably, a metal post 36 (Figs. 2 and 6), projecting forwardly from the casing wall 18 into which its rear end is threaded. Post 36 forms a pivotal support for the several parts of a contact device comprising a disk or dial 37 of any suitable insulating material, having a portion of its periphery projecting into an opening 38 in the outer wall 16 of the casing and knurled, as shown, for convenient manual engagement and rotation to adjust the position of the contacts hereafter described. The peripheral edge of the dial is suitably graduated and marked to indicate its different positions for different time lags, as shown in Fig. 10. A leaf spring detent 39 (Fig. 4) on the casing projects at one end into engagement with the periphery of the disk for frictionally retaining it in adjusted position.

Imbedded in disk 37, flush with its under surface, is an arcuate metal contact strip 40 (Figs. 5 and 6), engaging a spring contact finger 80a on the casing leading to one of the terminals, as hereafter described. Contact 40 is attached to the disk by a screw 41 which connects it electrically with an arcuate metal contact strip 42 imbedded in the opposite or upper face of the disk, flush with its surface, as shown. Imbedded in the upper face of the disk also is an arcuate contact strip 43, lying parallel with and spaced outwardly from contact 42. Contact 43 has one end secured to the disk by a screw 44, which is threaded at its inner end into an arcuate contact strip 45 imbedded in and flush with the under surface of the disk, as shown. These arcuate strips 40, 42, 43 and 45 are concentric with the disk on which they are mounted for rotary adjustment on post 36. The post 36 has fixed thereon a spring contact finger 46, the outer end of which is positioned for sliding engagement with contact 45 in one of the adjusted positions of the disk 37.

The contact disk 37 is normally stationary, after being adjusted to position corresponding to a particular time lag, and its contacts cooperate with movable contact means set and released in connection with each flash exposure, as well as with stationary contacts leading to the circuit terminals on the casing hereafter described. Such movable contact means comprises, preferably, a pair of spaced spring contacts 47 and 48 (Figs. 2 and 3), formed integrally with a plate 49 fixed by means of screws 50 on a plate 51 which is pivotally supported on the outer reduced end of post 36, concentric with disk 37. Contact 47 is positioned for sliding engagement with contact 42, while contact 48 slides in engagement with contact 43. Contact 42 terminates in spaced relation with plate 49, as shown in Fig. 2, and while contact 48 slides in engagement with contact 43, contact 47 moves into and out of engagement with contact 42 at a time depending upon the rotary adjustment of disk 37, so as to vary the time of closing of the circuit through the flashlight. Plate 51 has an arm 52 extending through an opening in the outer wall 16 of the casing, for manual engagement to rotate plate 51 on post 36, from the released or idle position shown in Fig. 1 to the set position shown in Fig. 2, against the tension of a spring 53 coiled about post 36 and acting to turn the plate in a clockwise direction. A cap 54, screwed into the top of the post, serves to hold in place the several parts mounted on the post. The rotation of plate 51 by spring 53 is preferably retarded slightly by any known or suitable retard device, such as the known gearing and pallet connection between the plate and the casing, as indicated in Fig. 1.

A latch means is provided for temporarily holding plate 51 and its contacts 47 and 48 in the set position shown in Fig. 2, in which the contacts 42 and 47 are initially spaced so that the flashlight circuit is open. Such means preferably comprises a pin 55 on plate 51 for cooperation with a notch 56 at the end of a latching lever 57 pivoted on a post 58 fixed in casing wall 18. A spring 59, coiled about the post, moves the lever in a counterclockwise direction and it will be seen that as plate 51 is moved counterclockwise to set position, pin 55 engages lever 57 and moves it clockwise against its spring, until pin 55 falls into notch 56 so as to hold the lever in the set position shown in Fig. 2.

Latching lever 57 is tripped by branch 35 of trigger 28 when the trigger is moved for an exposure. As lever 57 is held in its latching position and the trigger is turned in a counterclockwise direction (Fig. 3), a tail portion 60 on its branch 35 is moved into engagement with a pawl 61 on the oppositely extending end of the latching lever, so as to swing the lever in a clockwise direction, thereby releasing plate 51 for movement to close the circuit through the flashlight. Pawl 61 is pivoted at 62 on lever 57 and a spring 63 normally holds the pawl against a stop 64 on the lever for positive actuation thereof by the trigger. However, the pawl may yield in a counterclockwise direction to permit the tail 60 of the trigger to pass freely by the lever 57, in case the lever should be inadvertently set to latching position while the trigger tail is depressed. After latch lever 57 is tripped and the trigger is released, the trigger and latch lever are returned by their springs to the initial positions shown in Fig. 1, in which pawl 61 is located adjacent the outer wall 16 of the casing and out of the path of movement of the tail 60 of the trigger. It will thus be seen that the trigger may be operated in a normal way independently of any interference by the synchronizer mechanism, unless the synchronizer is set for operation by the movement of finger piece 52 to the position shown in Fig. 2.

Means are provided whereby the movement of contact plate 51, after closing the circuit, subsequently actuates the shutter mechanism to effect the exposure. To this end, as the plate nears its released position, as shown in Fig. 3, its pin 55 comes into engagement with a pawl 65 pivoted on a post 66 mounted on plate 18. The pawl is normally in positive engagement with a stop lug 67 fixed on the end 68 of a lever 69 which is also pivoted on post 66. A spring 70, coiled about the post, bears against a lug 71 on the pawl to turn it counterclockwise against stop lug 67 on the lever, while a spring 72, coiled about the post, bears against a second lug 73 on the lever so as to turn it clockwise until a shoulder 74 on the lever bears against the inner wall 17 of the casing. Lever 69 is thus normally positioned so that its extended end 75 lies closely adjacent the end 25 of the locking lever 22 of the shutter for actuating the same.

When the latch lever is tripped by the trigger, as shown in Fig. 3, it is stopped by the post 66 and in turn stops the movement of the trigger before the trigger pin 26 nears the locking lever 22, thus preventing the trigger from operating the locking lever after the synchronizer has been set for operation. At such times, the locking lever 22 is actuated instead through the synchronizer. When pin 55 of the plate 51 strikes pawl 65 of lever 69 (Fig. 3) and swings the lever to operate the shutter blades, the pin eventually snaps by the pawl. Thereafter the lever 69 returns to initial position in which its pawl 65 lies above the pin, as shown in Fig. 1, but the pawl is arranged to yield, as described, in any subsequent setting of the contact device, to allow the pin to swing upwardly past it for latching engagement with the latch lever 57.

It will be apparent from the above description that with the disk 37 adjusted for the known time lag of the flashlight employed, finger piece 52 and its contact plate are swung from the position shown in Fig. 1 to the set position of Fig. 2, in which position they are latched by the lever 57. In such position, the movable contact 47 is arranged in a spaced relation with contact 42, depending upon the adjusted position of the latter. The actuation of the trigger then trips the latch lever, and finger piece 52 and its contact plate 51, swinging back through the position shown in Fig. 3 to the release position shown in Fig. 1, thereby first bring contact 47 into engagement with contact 42 to complete the electric circuit through the flashlight. Continued movement of the plate 51 then actuates lever 69 which in turn operates locking lever 22 to effect the opening and closing of the shutter blades at a time which is precisely coordinated with the peak of illumination, through the adjustment of the disk 37.

The above described contact plates are particularly adapted for use with flashlight bulbs of the known varieties requiring an appreciable interval after the closing of the circuit before reaching their peak of illumination, such as the varieties of bulbs in commercial use having a time lag of from 5 to 25 milliseconds which are readily accommodated by the adjustment of the contact disk or dial 37. Other varieties of lamps such as that commercially known by the designation "Kodatron," are more rapid, supplying peak illumination at substantially the instant of closing of the circuit, with no appreciable time lag, and their circuit may be closed at approximately the instant of opening of the shutter blades. My invention includes a further adjustment for readily accommodating the characteristics of this high speed bulb also, comprising, for this purpose, an additional pair of timing contacts, one of which is preferably moved directly by the blade ring itself, into and out of engagement with the other. The employment of this pair of contacts involves their inclusion in the circuit in place of the adjustable contacts described above which are thereupon excluded from the circuit.

The adaptation of the circuit to such high speed lamps is accomplished through a further adjustment of the dial 37 indicated by a suitably positioned marking on its periphery. This adjustment is shown in Fig. 4 in which contacts 42 and 43 are positioned out of the range of the movable contacts 47 and 48. At the same time, contact sector 40 on the under side of disk 37 is brought to a position in which it is engaged at one end by the contact finger 46 on the post 36 and at its other end by a spring contact finger 76 extending upwardly into engagement therewith from a conducting plate 77 leading to an insulated terminal, 91, on the casing. Such arrangement electrically connects the terminal 91 through the post 36 and the casing with the blade ring 19 and a terminal mounted directly thereon.

The blade ring contact moves below an opening 78 in the wall 18 of the casing (Figs. 4 and 7), comprising a silvered contact area 79 embedded in and lying flush with the forward surface of the blade ring 19. In the movement of the ring corresponding to the closed and opened position of the blades, this contact moves from the position shown in dotted lines to the position shown in full lines in Fig. 4. Such movement carries the contact 79 into engagement with a spring contact finger 80, which, at other times, rests upon the surface of a plate 81 of insulating material on the ring. Contact finger 80 forms part of a conducting plate 82 lying on a sheet 83 of insulating material which underlies conducting parts of the synchronizer mechanism (except post 36) to insulate them from the wall 18 of the casing. Plate 82 which has also the contact finger 80a referred to above, leads through a safety switch, hereafter described, to the other insulated terminal 93 on the casing for connection with the flashlight portion of the circuit. The operation of the high speed contacts 79 and 80, as well as the adjustable contacts 42 and 47, depends upon the operation of such safety switch, which will now be described.

The safety switch comprises the conducting plate 82 which is formed with a gap or discontinuation shown at 84. This gap is bridged in the operation of the switch by a contact piece 85, Figs. 4 and 6, mounted on a sheet 86 of insulating material carried on one end of a lever 87 pivoted on post 36. Contact 85 is positioned for sliding engagement with plate 82, so as to bridge the gap 84 of the plate in the closed position of the switch. Contact 85, however, is normally positioned to open the switch, as shown in Figs. 1 and 2, being moved by its lever 87 to close the switch only after the setting of the synchronizer mechanism and during the period of movement of the trigger. This switch serves to prevent premature flashing of the bulb in case of its insertion while the synchronizer is in released or contact-making position, and further safeguards the mechanism against accidental shortcircuiting or grounding.

The means for controlling the safety switch comprises the extension of lever 87 on the opposite side of post 36, as at 88, this extension being formed with a transverse lug 89 lying in the path of pawl 61 of the latch lever 57 as it moves to the unlatched or released position shown in Fig. 1. Lever 87 is normally moved to position to close the switch by a spring 90 (Figs. 3 and 4) which is less strong, however, than the spring actuating the latching lever, so that the latching lever, in released position, moves the switch lever 87 to open position as shown in Fig. 1. The setting of the latch lever releases the switch lever except as it is restrained also by the tail 60 of the trigger. The trigger spring is likewise stronger than the switch lever spring, so that the switch lever cannot move to close the switch except during the actuating movement of the trigger. By this means, the circuit is normally kept open and closed only momentarily while the synchronizer is set and during the operating movement of the trigger.

It will now be apparent that in order to employ the timing contacts operated by the blade ring itself, the finger piece 52 is moved to set the synchronizer so as to cause it to release the safety switch and to actuate lever 69 and the locking lever 22 of the shutter. When the trigger is actuated, lever 87 is completely released so that the safety switch is closed. The trigger then trips the synchronizer which moves the locking lever 22 to release the blade ring for its opening and closing movements. Such movements close the circuit by means of the contacts 79 and 80 at the instant of opening of the shutter.

Plate 77 is electrically connected with the inner end of a terminal or jack 91 which is mounted in an insulated bearing 92 in the outer wall 16 of the casing. Plate 82, beyond the switch gap 84, is electrically connected with the inner end of the other terminal or jack 93, which is similarly mounted in an insulating bearing 94 in the wall of the casing. It will thus be seen that the circuit is continuously insulated from the casing except in the use of the timing contacts associated with the blade ring.

In the use of the adjustable contacts 42 and 47, for flashlights having a noticeable time lag, the corresponding adjustment of dial 37 arranges the circuit for operation as shown in the circuit diagram of Fig. 8. In such an arrangement the source of energy 95 and flashlight 96 are connected with the terminals 91 and 93. From terminal 91 the circuit leads through the fixed contact 76 to the contact 45 on dial 37, to contact 43 on the dial, through contacts 48 and 47 on plate 51, to contact 42 on the dial and thence through contact 40, to contact 80a, to the safety switch contacts 82 and 85, to the other terminal 93 and the source of energy 95.

The circuit as modified for the contacts associated with the blade ring is shown in Fig. 9 as leading from terminal 91 through contacts 76 and 45 to the finger 46 and post 36 of the casing, through which the circuit then passes to the blade ring and its contact 79. From the latter, the circuit leads through the cooperating contact 80 and the safety switch, to terminal 93 and the lamp circuit as before. It will be seen that all of the contacts are engaged with each other by a sliding interengagement which serves to keep them bright and clean and to avoid any jar or shock such as might derange the position of the camera.

In the operation of the mechanism, the safety switch formed by the parts 82, 84 and 85 is normally open so that the mechanism may be safely connected at any time through the terminals 91 and 93 with the flashlight and its source of energy. The contact disk or dial 37 is set, as indicated by its peripheral markings, either to position for employing the adjustable contacts 42 and 47, which are engaged with each other by the operation of the shutter trigger 28, or to position for employing the contacts 79 and 80, which are operated directly by the blade ring, depending upon the type of flashlight or bulb employed. In either case, finger piece 52 is then moved counterclockwise to the set position shown in Fig. 2, thereby tensioning spring 53, and latching the disk in set position with pawl 61 of the latching lever 57 moved into the path of movement of tail 60 of trigger 28. By such movement, the latching lever releases lever 88 of the safety switch, which is still retained in open position, however, by the tail of the trigger.

When the dial 37 is adjusted for using the contacts 42 and 47 for one of the longer time lags, operation of the trigger completes the release of lever 88, closes the safety switch, and trips the latching lever 57 and so releases plate 51 which is turned clockwise by its spring, engaging the contacts 42 and 47 at a time determined by the adjustment of the dial. Such engagement arranges the circuit as shown in Fig. 8, and starts the energization of the flashlight bulb. Meanwhile, tail 60 of the trigger has been stopped by the engagement of the latching lever 57 with post 66, but the continued rotation of plate 51 brings its pin 55 into engagement with pawl 65 of lever 69 which is thereby moved to actuate the locking lever 22 and open the shutter blades to their wide open position at the instant at which the illumination reaches its peak. Latch lever 57 has then moved to its release or normal position shown in Fig. 1, out of the path of movement of the trigger, but into contact again with lever 88 so as to operate the safety switch and open the circuit. The trigger is thus left free for subsequent use in a normal way, for operating the shutter, without interference by the synchronizer until the latter is again set for use. The operator is thereby relieved of the necessity for arranging or adjusting any parts of the mechanism when it is desired to use the shutter without the synchronizer. The camera is thus conveniently left ready for normal use and the operator can readily remember to make the necessary adjustments when the synchronizer is employed.

In the use of a high speed bulb reaching its peak of illumination at substantially the instant that the circuit is closed, dial 37 is rotated to the corresponding marking, which carries contacts 42 and 43 out of range of movement of the contacts 47 and 48 and so out of the circuit. Such adjustment, however, brings the sector 45 on the under side of the disk to position for bridging the contacts 46 and 76 so as to complete the circuit, except for the safety switch. This arrangement of the circuit is shown in Fig. 9. The finger piece 52 is then moved counterclockwise as before to set position and held by latch lever 57 which is thereby moved to release the safety switch, the contacts 79—80 then occupying the position shown in Fig. 1. Upon actuation of the trigger, the safety switch is closed, the latch lever is tripped, lever 69 is actuated and lever 22 moved to actuate the blade ring to open the shutter blades. Such movement of the blade ring moves contact 79 to the closed position shown in Figs. 3 and 4, thereby completing the circuit as shown in Fig. 9, so as to synchronize the shutter opening with the peak of illumination afforded by a bulb of the high speed variety referred to.

The described construction affords a synchronizer mechanism which is built into and housed and protected within the shutter casing itself. Unless deliberately set for use, the synchronizer leaves the camera ready for normal use without any preliminary adjustments required by the synchronizer. When set for use, the synchronizer mechanism, because of the relatively light nature of its moving parts and actuating springs, operates with a light motion, free of any impact or shock which might derange the position of the camera. Except during the instant of operation of the contacts associated directly with the blade ring, the circuit is continuously insulated from the casing and it is automatically opened after each operation so as to avoid any premature flashing of the lamp or bulb, as well as any accidental shortcircuiting of any of the parts.

This invention is in the nature of an improvement upon the invention disclosed and claimed in my copending application, Serial No. 437,889, filed April 6, 1942, Photoflash synchronizing mechanism, in which claim is made to certain of the subject matter disclosed but not claimed in the present application.

It will thus be seen that the invention accomplishes its objects and while it has been herein disclosed in a preferred embodiment, it is to be understood that such disclosure is intended as illustrative, but not as a limitation of the invention, as it is contemplated that various alterations and modifications in the construction and arrangement of the parts will readily occur to those skilled in the art, within the spirit of the invention and the scope of the appended claims.

I claim:

1. In a camera shutter mechanism having a casing, a member in said casing operable to effect the opening and closing of the shutter blades and a trigger for operating said member, a flashlight synchronizer device in said casing comprising a flashlight circuit including a pair of insulated electrical contacts, said circuit being continuously insulated from said casing, spring actuated means for closing said contacts, setting means for said spring actuated means arranged for actuation by said trigger, a normally open safety switch in said circuit having connections with and being controlled by both said trigger and said setting means, and a part operated by the actuation of said device for subsequently operating said member to effect synchronous opening and closing of said shutter blades.

2. In a camera shutter mechanism having a member operable to effect the opening and closing of the shutter blades and a trigger for operating said member, a flashlight synchronizer device comprising a pair of insulated electrical contacts, spring actuated means for closing said contacts, setting means for said spring actuated means comprising latch means arranged for actuation by said trigger, a normally open switch in said circuit having connections with and being controlled by both said trigger and latch means, and a part operated by the actuation of said latch means for subsequently operating said member to effect synchronous opening and closing of said blades.

3. A photoflash synchronizer mechanism for a photographic shutter of the set type provided with means for locking the shutter in set position and a trigger for releasing said locking means independently of said synchronizer mechanism to effect opening and closing movements of the shutter, said synchronizer mechanism comprising an electrical circuit including a pair of timing contacts having a relative movement into and out of engagement with each other, setting means for said contacts adjustable to and from position for establishing a connection between said shutter trigger and said synchronizer mechanism for effecting engaging movement of said contacts to energize said circuit, a safety switch in said circuit having an actuating part arranged in the paths of movement of said contact setting means and shutter trigger for joint control thereby, and a part actuated by the actuation of said contact setting means for subsequently releasing said shutter locking means.

4. The combination with a camera shutter of the set type having a blade ring, of a flashlight synchronizer mechanism comprising a circuit including a first pair of contacts, a common means for closing said contacts and operating said blade ring to open and close the shutter blades, a second pair of contacts in said circuit one of which is movable by said blade ring into circuit closing engagement with the other, and means for effecting the closing of said circuit, selectively, by one or the other of said pairs of contacts, in accordance with the time lags of said flashlight and shutter, to synchronize the operations thereof.

5. The combination with a camera shutter of the set type having a blade ring, of a flashlight synchronizer mechanism comprising a circuit including a first pair of contacts, a common means for closing said contacts and operating said blade ring to open and close the shutter blades, a device for varying the time of closing of said contacts after actuation thereof by said common means, a second pair of contacts in said circuit one of which is movable by said blade ring into circuit closing engagement with the other, and means for effecting the closing of said circuit, selectively, by one or the other of said pairs of contacts, in accordance with the time lags of said flashlight and shutter, to synchronize the operations thereof.

6. The combination with a camera shutter mechanism having a blade ring, a member operable to move said ring for opening and closing the shutter blades, and a trigger movable to operate said member, of a flashlight synchronizer mechanism comprising a circuit including a first pair of contacts, means actuated by said shutter trigger for closing said contacts and operating said shutter member, a second pair of contacts in said circuit one of which is movable by said blade ring into engagement with the other, and means for effecting the closing of said circuit, selectively, by one or the other of said pairs of contacts, in accordance with the time lags of said flashlight and shutter, to synchronize the operations thereof.

7. The combination with a camera shutter mechanism having a blade ring, a member operable to move said ring for opening and closing the shutter blades, and a trigger movable to operate said member, of a flashlight synchronizer mechanism comprising a circuit including a first pair of contacts, spring means for closing said contacts, means for setting said contacts in position for closing operation, a connection with said shutter trigger for releasing said contacts for closing and for operating said shutter member, one of said contacts being adjustable in position to vary the relative spacing and time of engagement thereof, a second pair of contacts in said circuit one of which is movable by said blade ring into engagement with the other, and a device for effecting a relative adjustment of said contacts for closing said circuit, selectively, by one or the other of said pairs of contacts, to synchronize the operations of said flashlight and shutter in accordance with the time lags thereof.

8. The combination with a camera shutter mechanism having a blade ring, a member operable to move said ring for opening and closing the shutter blades, and a trigger movable to operate said member, of a flashlight synchronizer mechanism comprising a circuit including a pair of contacts, spring actuated means for setting said contacts in position for closing operation, means for separating said contacts, means actuated by said shutter trigger for releasing and closing said contacts and operating said shutter member, one of said contacts being adjustable in position to vary the relative spacing and time of engagement thereof, a second pair of contacts in said circuit one of which is movable by said ring into engagement with the other, and a device for moving said adjustable contact of said first pair beyond the path of engagement with the other contact of said first pair, for disabling said first pair of contacts and controlling said circuit by said second pair of contacts, to synchronize said flashlight and shutter in accordance with the time lags thereof.

9. In a camera shutter mechanism having a member operable to effect the opening and closing of the shutter blades and a trigger movable to operate said member, a flashlight synchronizer comprising a flashlight circuit including a pair of timing contacts, means for effecting relative movement of said timing contacts into engagement with each other, latch means movable to set position for restraining said engaging movement of said timing contacts, a part on said trigger for tripping said latch means, a pair of switch contacts, a lever for moving said switch contacts into engagement with each other, said lever being arranged for engagement by said latch means and by said trigger for moving the same to separate said switch contacts, and a part actuated by said relative movement of said timing contacts for subsequently operating said member to effect synchronous opening and closing of said blades.

10. In a camera shutter mechanism having a blade ring, a member operable to move said ring for opening and closing the shutter blades, and a trigger movable to operate said member, a flashlight synchronizer comprising a flashlight circuit including a first pair of contacts, means for separating said contacts, means actuated by said trigger for engaging said contacts and operating said member, one of said contacts being adjustable in position to vary the relative spacing and time of engagement thereof, a second pair of contacts in said circuit one of which is movable by said ring into and out of engagement with the other, and a manually adjustable device including additional contact means for selectively disconnecting either of said pairs of contacts and connecting the other pair in said circuit.

11. In a camera shutter mechanism having a blade ring, a member operable to move said ring for opening and closing the shutter blades, and a trigger movable to operate said member, a flashlight synchronizer comprising a flashlight circuit including a first pair of contacts, means for separating said contacts, means actuated by said trigger for engaging said contacts and operating said member, one of said contacts being adjustable in position to vary the relative spacing and time of engagement thereof, a second pair of contacts in said circuit one of which is movable by said ring into and out of engagement with the other, and a manually adjustable device for positioning said adjustable contact of said first pair and thereby timing said flashlight, said device being movable also to disable one of said pairs of contacts for controlling said circuit by the other of said pairs.

12. In a camera shutter mechanism having a blade ring, a member operable to move said blade ring for opening and closing the shutter blades, and a trigger movable to operate said member, a flashlight synchronizer comprising a flashlight circuit including a first pair of contacts, means for separating said contacts, means actuated by said trigger for closing said contacts and operating said member, one of said contacts being adjustable in position to vary the relative spacing and time of engagement thereof, a switch controlling said circuit, means actuated by said trigger for closing said switch, a second pair of contacts in said circuit, one of said contacts being movable by said blade ring for engagement with the other of said pair, and a manually adjustable device for positioning said adjustable contact of said first pair and thereby timing said flashlight, said device being movable also to disable one of said pairs of contacts for controlling said circuit by the other of said pairs.

13. In a camera shutter mechanism having a blade ring and a member operable to move said ring for opening and closing the shutter blades, a flashlight synchronizer comprising a flashlight circuit including a first pair of contacts, means connecting said contacts with said member to effect relative movement of said contacts into engagement with each other upon operation of said member, a second pair of contacts one of which is connected with said ring for movement thereby into engagement with the other thereof, and adjustable means for disabling one of said pairs of contacts and closing said circuit through the other of said pairs, for synchronizing the flashlight illumination with the opening of said shutter mechanism.

14. In a camera shutter mechanism having a casing, a blade ring in said casing and a member operable to move said ring for opening and closing the shutter blades, a flashlight synchronizer mechanism in said casing comprising a flashlight circuit including a first pair of contacts, means connecting said contacts with said member to effect relative movement of said contacts into and out of engagement with each other, a second pair of contacts one of which is connected with said ring for movement thereby into and out of engagement with the other of said second pair, and means on the exterior of said casing and provided with indicating graduations for adjusting the relative spacing and time of engagement of said first pair of contacts and also for disabling one of said pairs of contacts and closing said circuit through the other of said pairs, for synchronizing the illumination by said flashlight with the opening of said shutter blades.

ALFRED SCHWARZ.